United States Patent
Womack et al.

[11] Patent Number: 5,096,571
[45] Date of Patent: Mar. 17, 1992

[54] RECOVERY OF SULFUR FROM NATIVE ORES

[75] Inventors: James T. Womack, Belle Chasse; Tadeusz K. Wiewiorowski, New Orleans; Vivian C. Astley, New Orleans; Jesus W. Perez, New Orleans; Thomas A. Headington, Harvey, all of La.

[73] Assignee: Freeport McMoRan Resource Partners, Ltd. Partnership, Del.

[21] Appl. No.: 448,963

[22] Filed: Dec. 12, 1989

[51] Int. Cl.$^5$ ................................................ B03D 1/02
[52] U.S. Cl. ...................................... 209/164; 209/11; 209/166; 241/24; 241/78
[58] Field of Search .................. 209/164, 166, 167, 11; 241/24, 20, 78; 23/293 S, 308 S; 423/567 A, 578 R, 578 A

[56] References Cited
U.S. PATENT DOCUMENTS

| | | | |
|---|---|---|---|
| 1,697,402 | 1/1929 | Nutter | 209/166 |
| 2,537,842 | 1/1951 | Gauley | 241/17 |
| 2,798,034 | 7/1957 | Egbert et al. | 202/46 |
| 2,841,536 | 7/1958 | Egbert | 202/46 |
| 3,102,792 | 9/1963 | Eads et al. | 23/294 |
| 3,512,943 | 5/1970 | Dubow | 23/267 |
| 3,607,143 | 9/0197 | Wierman | 23/312 |
| 3,634,046 | 1/1972 | Allen | 238/308 |
| 3,838,979 | 10/1974 | Sims | 23/293 |
| 4,871,447 | 10/1989 | Adamache | 241/24 |

OTHER PUBLICATIONS

"Sulfur Recovery From Low Grade Surface Deposits", by T. P. Forbath Mining Engineering Magazine, Sep. 1953, pp. 881–885.
"Cove Creek Sulfur", by Clarence King, Mining Engineering Mag., Apr. 1953, pp. 375–378.

Primary Examiner—Stanley S. Silverman
Assistant Examiner—Thomas M. Lithgow
Attorney, Agent, or Firm—Fisher, Christen & Sabol

[57] ABSTRACT

A process for recovering elemental sulfur from volcanic and non-volcanic ores is disclosed. Ore is processed by crushing the ore to a coarse particle size autoclaving to separate the sulfur from the ore, mild grinding to selectively reduce the size of the liberated sulfur particles, flotation and sulfur separation/filtration steps to produce a sulfur of at least 99% purity. The process recovers at least 90% of the elemental sulfur contained in the ore. The particular crushing of the ore and selective grinding techniques for reducing sulfur particles for reducing sulfur particles size are important factors in the efficiency of the process since the grinding techniques inhibit the formation of fine gangue which is difficult to separate from the liberated sulfur.

31 Claims, 1 Drawing Sheet

RECOVERY OF SULFUR FROM NATIVE ORES

FIELD OF THE INVENTION

This invention relates to a process for recovering sulfur from native ores which contain free elemental sulfur. In an important aspect of the invention, sulfur is recovered from volcanic ore deposits.

BACKGROUND OF THE INVENTION

Some sulfur deposits are naturally associated with volcanic regions and early sulfur mines were often located in volcanic areas such as Sicily. The Sicilian method of extracting sulfur originally consisted of piling the sulfur bearing rock into large mounds which were then ignited at the top. The heat of combustion of the sulfur in the ore caused underlying layers of sulfur to melt and melted sulfur was collected in molds. This process was very time consuming and inefficient, i.e., sulfur recovery was only about 50%, and copious amounts of obnoxious fumes were produced. The Gill gas furnace, introduced in 1880, moved the sulfur burning operation into chambers and improved the recovery to as high as 80%. Still sulfur wastage was excessive and atmospheric pollution remained severe.

In 1902, the well-known Frasch Process was commercialized and large quantities of very pure sulfur began to be produced by this process from the salt dome deposits of Louisiana and Texas and, later, from other types of elemental sulfur deposits in Mexico, Poland and Iraq. The Frasch Process was very efficient and inexpensive sulfur produced by the Frasch Process and later, from a number of by-product sulfur sources, i.e. sour natural gas, crude oil, etc., eventually largely replaced sulfur Production from deposits of volcanic origin. In recent years however, the exhaustion of many sulfur deposits amenable to the Frasch Process coupled with a steady increase in sulfur demand has led to a renewed interest in the volcanic origin sulfur ores and in other low grade surface deposits of elemental sulfur.

Although volcanic deposits of sulfur occur in many parts of the world and constitute a potentially valuable resource, most of the deposits are not worked. There are several reasons for this. First, the deposits often occur in isolated areas and at high altitudes where transportation and other logistics problems are prohibitive. Because of the inaccessible location, industry has been slow to commit funds to develop the deposits. Second, the much used, efficient Frasch Process cannot be used to mine many of the deposits because the deposits often occur at shallow depths and the Frasch Process requires several hundred feet of overburden. In addition, the finely disseminated nature of the sulfur does not easily coalesce in the Frasch process. Third, the presence of fine gangue in the sulfur has made it difficult to produce a sulfur of the quality usually produced by the Frasch Process. Fourth, much of the sulfur in some deposits is in the form of "sulfides", i.e., iron pyrites, which are particularly difficult to recover. The present process is intended to recover elemental sulfur; not pyritic sulfur.

Many extraction processes other than the Sicilian method and the Frasch Process have been attempted over the years and have met with limited success. The processes have included thermal methods such as distillation and vaporization, flotation, solvent extraction, filtration and a combination of several of these processes. U.S. Pat. Nos. 3,838,979 and 3,102,792 describe thermal methods. U.S. Pat. No. 3,634,046 describes a filtration method for separating molten sulfur from gangue. U.S. Pat. Nos. 2,841,536, 3,512,943, 3,607,143 and 2,798,034 describe solvent extraction processes for recovering sulfur from volcanic and other surface deposits. None of the processes described in the aforementioned patents have been extensively used in industry and all suffer when compared economically with the Frasch Process.

Various combinations of autoclaving, filtration, and centrifuging are used in some processes for recovering sulfur. One such process, elements of which were first disclosed in U.S. Pat. No. 2,537,842, transfers an aqueous slurry of ground volcanic ore to a pressurized vessel or pipe reactor in which heat and agitation cause sulfur particles to melt and agglomerate. The agglomerated sulfur particles are then quenched and the quenched sulfur is separated from remaining gangue by froth flotation, melting and filtration steps. While the process of the '842 patent represents an improvement over any existing processes for recovering volcanic sulfur, it still suffers from relatively high operating costs due partly to inefficiencies in the froth flotation step. The process also requires that ore fed to the process be ground to a fine particle size which increases the cost of the operation and the difficulty in separating the sulfur from the gangue.

A recurring problem in processes developed for recovering elemental sulfur from volcanic ore has been the difficulty of separating the liberated sulfur from the fine ore gangue generated by the processes. The process described herein addresses that problem.

Although the preceding discussion concentrated on elemental sulfur ore deposits of volcanic origin since numerous ore deposits of volcanic origin exist, the discussion is applicable to elemental sulfur ores of non-volcanic origin which lie on or near the surface and which are not amenable to development by the Frasch Process. The process of the present invention may also be used to recover sulfur from waste products which contain sulfur in disseminated form, for example, filter cake from sulfur filtration operations.

There is a need in the sulfur industry for a process which can economically recover elemental sulfur from volcanic ores. The need will increase as Frasch Process-amenable ore deposits become depleted.

It is therefore an object of the present invention to provide an economical process for the recovery of elemental sulfur from volcanic and non-volcanic ores which is economical and efficient. These and other objects and advantages of the invention will be apparent from the description which follows.

SUMMARY OF THE INVENTION

Ore containing elemental sulfur is crushed to a relatively coarse particle size, slurried in water, optionally mixed with an alkaline material, such as lime, to adjust the pH of the slurry to at least 8.0, heated to above the melting point of sulfur and agitated to force separation of the molten sulfur from the ore. The resulting sulfur-ore gangue-water slurry is then processed in a pebble mill to reduce the size of the sulfur particles to make the sulfur amenable to a subsequent flotation step. Following the flotation step, the resulting flotation concentrate is further processed through various purification steps to produce a high-quality liquid sulfur product.

Size reduction operations, i.e. initial ore crushing and a later pebble mill grinding step, are important features in the successful operation of the process. The crushing and grinding techniques developed for the process are particularly effective because neither produces the fine gangue that is difficult to separate from sulfur during flotation. Another particularly advantageous feature of the invention is that the initial preparation of the ore involves only crushing and does not entail grinding.

DETAILED DESCRIPTION OF THE PREFERRED EMBODIMENTS

Figure 1:
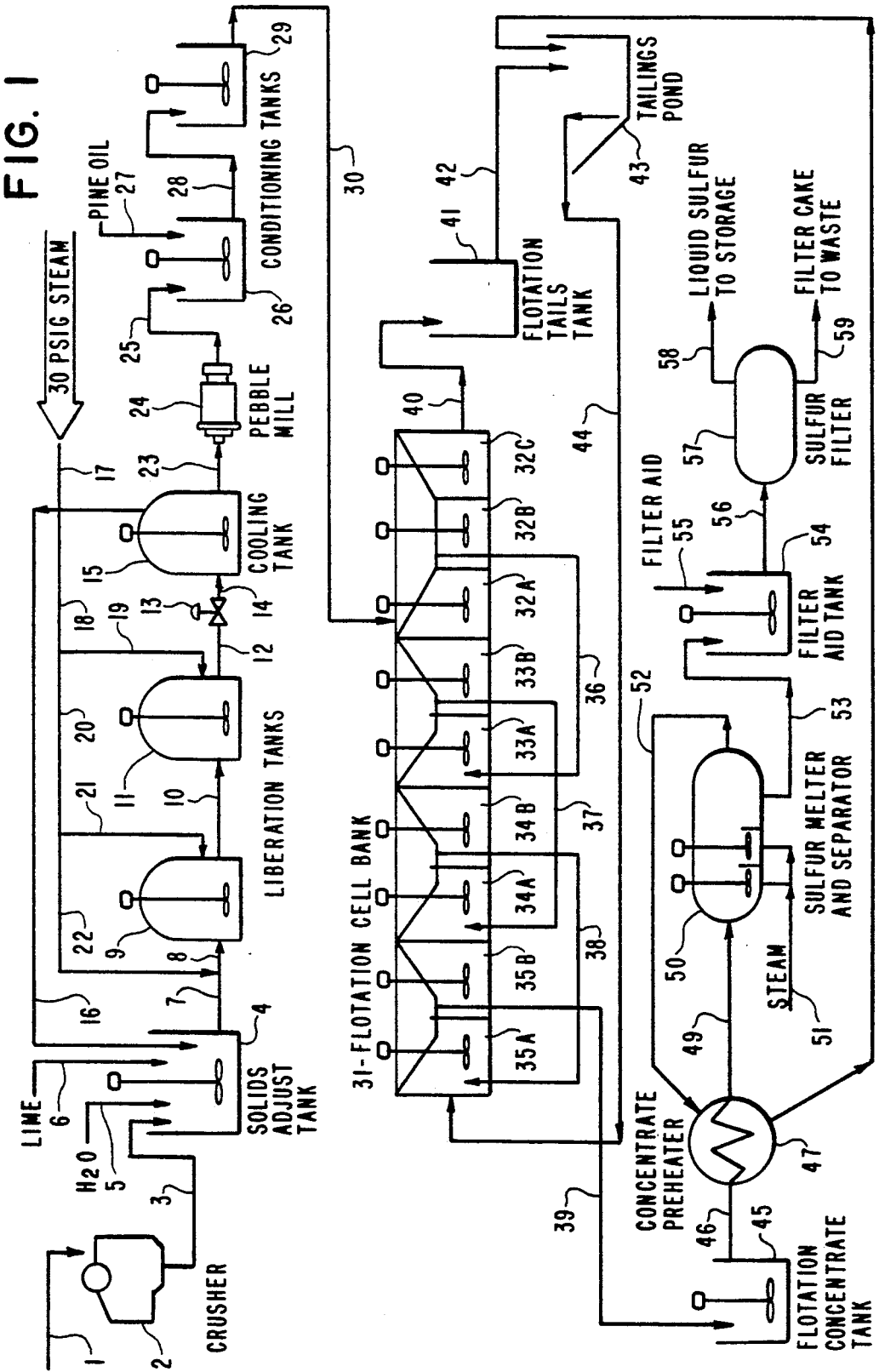
FIG. 1 is a block diagram of a preferred embodiment of this process.

The present process is primarily intended for volcanic ores containing at least 5% elemental sulfur and, preferably, at least 10% elemental sulfur. The process according to the invention will extract sulfur from much leaner ores containing less than about 5% elemental sulfur, although extraction of sulfur from such lean ores may not be economically profitable. The ore contains preferably less than about 10% sulfidic (e.g. pyrite) matter. The efficiency of sulfur recovery and quality of the sulfur recovered generally decreases as the content of sulfidic matter increases. The process of the invention is particularly suited for use in recovering sulfur from volcanic ore. Non-volcanic ores with similar sulfur contents may also be processed in accordance with the process of the invention.

Referring to FIG. 1 for a detailed description of the invention, the ore first enters crusher 2 via line 1. The crushing step of the present invention is of particular importance. One of the significant discoveries of the inventors is that sulfur is more easily separated from coarsely crushed ore and ore gangue than from finely ground ore and ore gangue in subsequent heat liberation (autoclaving) and flotation operations. It is therefore preferable to reduce the size of the ore to a particle size sufficiently small such that sulfur can be liberated during a heated step, and also be sufficiently large to produce an ore gangue that is not susceptible to flotation such that the ore gangue does not interfere with sulfur recovery. The inventors found it desirable to limit the amount of fines generated in the crushing step to such an extent that less than about 15% by weight of the crushed ore is −100 mesh.

The limitation on the quantity of ore fines is accomplished by controlling the grinding operation so that most of the ore is crushed to a relatively coarse particle size. Although different ores vary considerably in the amount of crushing required to meet the fines limitation, it was determined the fines limitation could be met in the preferred embodiment of the invention if the ore is crushed to a maximum particle size of about 1/10 inch to about 1 inch. More preferably, the ore is crushed to a maximum particle size of about 1/5 inch to about ⅜ inch.

The coarsely crushed ore is next forwarded by line 3 to agitated solids adjust tank 4. The solids adjust tank 4 also receives, via line 16, exhaust steam from a liberation tank 15 as discussed in greater detail hereinafter. Make-up water is added via line 5 to the solids adjust tank 4 as needed to produce a slurry with a solids concentration of about 50–80% by weight and preferably about 60–70% by weight and even more preferably about 64–68% by weight. A pH adjusting agent is added as needed, via line 6 to the solids adjust tank 4 to adjust the slurry pH (pH of the liquid phase of the slurry) to at least about 8.0, and preferably to a value of about 8.0 to 9.0. The pH of the slurry should not be allowed to exceed about 10.0. The pH adjusting agent may be, for example, an alkaline material, such as soda ash or lime, although any conventional pH adjusting agent may be used. The pH adjustment step is important, when needed, since droplets of molten sulfur liberated in the subsequent heat liberation step will remain in suspension at lower slurry agitation rates (and lower power requirements) at the higher pH. The reason for this is not completely understood although it is thought that the higher pH affects the surface tension of molten sulfur in such a way that smaller, more easily suspendable droplets of molten sulfur are formed. The pH adjustment is not always required since some individual ore characteristics are such that the liberated molten sulfur droplets remain in suspension at satisfactorily low slurry agitation rates without pH adjustment. It is imperative to keep the liberated sulfur droplets in suspension. If the molten sulfur settles, the sulfur will pool at the bottom of the autoclave. The pooled sulfur solidifies into excessively large sulfur pieces which cannot be efficiently processed in subsequent pebble grinding or flotation steps.

The mixing of the slurry and exhaust steam condensate in the solids adjust tank 4 generally raises the temperature of the slurry to about 160°–180° F. The hot slurry exits the solids adjust tank 4 by line 7, combines with steam from a line 22, and the combined slurry-steam mixture enters the agitated liberation tank 9 by means of line 8. The liberation tank 9 is the first of three agitated tanks 9, 11 and 15 arranged in series through which the heated slurry and steam mixture is sequentially passed via lines 10, 12 and 14 respectively. The slurry is partially processed in each tank. The two liberation tanks 9 and 11 are, in the preferred embodiment, autoclaves to melt the sulfur contained in the ore and promote separation or liberation of the molten sulfur from the ore gangue. In addition to the steam added by line 22 to the slurry, as the slurry enters the first liberation tank 9 via line 8, steam may be optionally introduced to the liberation tanks 9 and 11 via lines 17, 18, 19, and 20 respectively. Sufficient steam is optionally added to liberation tanks 9 and 11 to maintain the slurry in the liberation tanks generally at about 240° F. to about 280° F., preferably about, 250° F.–280° F. A slurry temperature of up to 315.F may be used but higher pressure steam would be required. Liberation tanks 9 and 11 are agitated during the heating operations at a rate sufficient to maintain the molten sulfur droplets in suspension which are formed during the heating operations. When certain difficult ores are processed, more intense agitation of the slurry in liberation tanks 9 and 11 may be required to maintain the molten sulfur droplets in suspension. The intensity of agitation required to maintain the sulfur droplets in suspension is reduced if the pH is maintained at about pH 8 compared to the lower pH.

A cooling tank 15, the final tank in the aforementioned series, is provided to reduce the temperature of the slurry. The slurry and steam condensate resulting from the heating operations in liberation tanks 9 and 11 are discharged from liberation tank 11 via line 12, pass through a depressurizing valve 13 and enter the cooling tank 15 via line 14. The slurry and steam condensate flashes as it passes through the depressurizing valve 13 into the cooling tank 15 which is maintained at or about atmospheric pressure. The low pressure steam flashed into the cooling tank 15 is vented via a line 16 to recycle the steam to the solids adjust tank 4 as previously discussed. The depressurizing/venting operations have the effect of maintaining the temperature of cooling tank 15 below the melting point of sulfur. The molten sulfur droplets liberated in liberation tanks 9 and 11 solidify at the lower temperature.

The total residence time of the slurry in liberation tanks 9 and 11, and cooling tank 15 is generally about 2 minutes per tank. The actual melting and liberation of the sulfur from the ore occurs very rapidly, generally in about 10 seconds, however, longer residence time is needed to optimize process efficiency. The required residence time may depend on the pressure and temperature of the liberation tanks and the particle size of the ore. The number of liberation/cooling tanks that can be used in the present process is not limited to three. More or fewer than three tanks can be used as needed. The use of at least three tanks, however, provides effective sulfur liberation from the ore. Multiple liberation/cooling tanks may be arranged in series-parallel as well as series (as shown in FIG. 1). Additionally, the tanks may be operated on either a batch or continuous basis. When ores from some volcanic deposits are processed, the particle size of the solid sulfur exiting the cooling tank 15 is consistently small enough for a subsequent flotation step and can be fed, after an intervening conditioning step, directly to a flotation cell bank 31. The most efficient flotation of the sulfur and ore gangue mixture is generally achieved when about 85% of the sulfur particles are about 28 mesh or less.

Sulfur liberated from most ores, however, is not of a sufficiently small particle size and is therefore subjected to grinding by a suitable apparatus, such as a pebble mill 24, before entering the flotation operation. In the preferred embodiment of the invention the slurry is milled under conditions such that the sulfur is reduced in particle size, but the particle size of the ore gangue is not substantially reduced. Reducing the size of the sulfur particle without grinding the gangue produces a slurry wherein the sulfur can be easily separated in a flotation step without extensive amounts of the ore gangue being carried over with the sulfur. The milling process used preferably is able to selectively reduce the particle size of the sulfur such that about 85% by weight of the sulfur particles are 28 mesh or smaller.

Pebble mills are ball mills or tumbling mills equipped with ceramic or natural pebble grinding media and, generally, with ceramic or non-metallic liners. A major advantage of using a pebble mill as the grinding apparatus in the present invention is that the relatively mild pebble mill grinding operation can be adjusted so as to reduce the size of sulfur particles while having minimal effect on the size of the more abrasion-resistant and crush-resistant ore gangue particles. That is, differential grinding of the two mineral species present is achieved with the softer sulfur component being ground preferentially. Differential grinding can only be accomplished when the components being ground, i.e., sulfur and ore gangue of the present invention, exhibit significantly different hardness, resilience and/or strength properties. Differential grinding action is achieved through a careful selection of mill apparatus, i.e. grinding media, and mill operating parameters. Grinding media with hardness and density characteristics similar to the hardest component, i.e., ore gangue of the present invention, is selected. Size reduction of the hardest component is thereby hindered and that of the softer sulfur component is enhanced. The preferential size reduction of the sulfur, described above, is a major factor in making the ore gangue-sulfur-water slurry more amenable to flotation and separation of the sulfur from the slurry. Other types of grinding equipment capable of the same type preferential size reduction may be substituted for the pebble mill.

When pebble mill grinding is required, the slurry (about 50% by weight solids) of ore gangue, liberated solid sulfur and water, exits the cooling tank 15 and passes by line 23 to the pebble mill 24. About 10–15 minutes is required for pebble mill 24 to reduce sulfur to the proper size for flotation and separation.

Some trade-off exists between pebble mill grinding time required and the agitation rates of heat liberation tanks 9 and 11. For example, if higher agitation rates are used in heat liberation tanks 9 and 11, a finer size liberated sulfur is produced and less pebble mill grinding is required to attain the desired sulfur particle size. In one embodiment of the invention, the ore slurry is heated and agitated for a period of time and at a sufficient velocity to liberate the sulfur and produce sulfur particles where about 85% of the sulfur particles are about 28 mesh or smaller. In this embodiment the selective sulfur milling step may not be required to achieve satisfactory flotation of the sulfur.

The slurry from the pebble mill 24 is forwarded by line 25 to conditioning tank 26 to which a flotation aid is added via line 27. The flotation aid may be any conventionally used flotation aid such as, for example pine oil. About 0.75 pounds of pine oil per ton of sulfur and ore gangue solids is generally required. The pine oil adsorbs onto the sulfur and improves the flotation characteristics of the sulfur in the subsequent flotation step. About 5 minutes residence time is generally required for the pine oil to properly condition the sulfur. The slurry exits the conditioning tank 26 by line 28 and is passed to an optional second conditioning tank 29. The second conditioning tank 29 is not essential but may be provided to ensure proper conditioning of the sulfur with the flotation aid before the flotation step.

The slurry is next passed via line 30 to a flotation cell bank 31 which, as illustrated in FIG. 1, is comprised of one rougher section 32 and three cleaner sections 33, 34, and 35. Each of the rougher and cleaner flotation sections is further partitioned into two or three flotation cells (each cell of a section is designated A, B or C) as shown in FIG. 1. The slurry, consisting of sulfur and ore gangue, first enters rougher section 32. A sulfur-rich slurry overstream exits the rougher section 32 by line 36 and is passed to the cleaner flotation section 33 where a second flotation step is conducted. Again, a sulfur-rich overstream is produced and this process is repeated, using transfer lines 37 and 38, in cleaner flotation sections 34 and 35. Each flotation step increases the concentration of sulfur in the slurry overstream. The sulfur content of the solid phase of the slurry exiting cleaner flotation section 35 via line 39 is generally above about 90% and often exceeds about 95% by weight. The slurry exiting the cleaner flotation section 35 is hereinafter referred to as flotation concentrate. The flotation operation is carried out at a slurry solids concentration of about 10%-20%. Water, as needed to maintain the solids concentration in the desired range, enters cleaner flotation section 35 by line 44.

In flotation sections 32, 33, 34 and 35, the flotation tailings, consisting primarily of ore gangue particles, move countercurrent, to the flow of the sulfur-rich stream described above via conventional means. The flotation tailings exit flotation section 32 via line 40 and are passed to flotation tailings tank 41. The flotation tails are transferred from flotation tails tank 41 by line 42 to tailings pond 43 which also receives, by line 48, the aqueous stream from concentrate preheater 47 as described hereinafter. In tailings pond 43, solids are allowed to settle from the flotation tailings and the resulting clarified water is sent by line 44 to the cleaner flotation section 35, as needed to maintain the solids concentration in the desired range.

Although most operations in the present process can be performed on either a continuous or batch basis, the flotation operation is most efficient if performed on a continuous basis.

Sulfur can be recovered from the sulfur-rich flotation concentrate exiting flotation section 35 using various combinations of techniques known to the industry. A description of one particularly efficient method of extracting the sulfur follows.

The sulfur-rich flotation concentrate exits flotation section 35 by line 40 and is forwarded to flotation concentrate tank 45 which serves as a surge tank. A thickener or filtration unit may, optionally, be placed in the process after the flotation concentrate tank 45 to remove excess water.

The flotation concentrate is next advanced by line 46 to the concentrate preheater 47 where it is heated to about 200°-205° F. by indirect contact with hot discharge water from sulfur melter/separator 50 returned to concentrate preheater 47 via line 52.

The flotation concentrate exits concentrate preheater 47 via line 49 and flows to sulfur melter/separator 50. Sulfur melter/separator 50 is a pressurized vessel preferably equipped with agitating means and baffles to facilitate the sulfur melting and sulfur-water separation operations conducted in the vessel. Steam enters the sulfur melter/separator 50 by line 51 and, by direct contact, heats the flotation concentrate to a temperature of about 250° F., which is above the melting point of sulfur. The flotation concentrate is generally heated from about 240° F. to about 280° F., preferably about 250° F. As the sulfur melts, the molten sulfur tends to separate from the water because of the large difference in specific gravity between the two liquids and the molten sulfur collects at the bottom of sulfur melter/separator 50. The separated water collects at the top of melter/separator 50 and is removed from sulfur by line 52 to the concentrate preheater 47. The separated water is used to heat the flotation concentrate by indirect contact. Residual ore gangue contained in the flotation concentrate is selectively wetted by the water in melter/separator 50 and much of the residual ore gangue exits with the aforementioned water to concentrate preheater 47. From concentrate preheater 47 the water and wetted ore gangue pass, via line 48, to the tailings pond 43.

Molten sulfur, essentially water-free but still containing a small amount of impurities, exits sulfur melter/separator 50 by line 53 and is passed to agitated filter aid tank 54 to which a filter aid, is added, as needed, via line 55. The filter aid may be a conventionally used filter aid including, for example, diatomaceous earth. The filtration characteristics of the sulfur and contained impurities determine whether the filter aid is added intermittently as a precoat or whether a filter aid must also be added continuously as a body feed. The mixture of molten sulfur and filter aid is advanced by line 56 to sulfur filter 57 where leaf filters or other type of industrial filters are used to produce a molten sulfur product of high purity. The filters are generally able to produce sulfur containing less than 1.0% impurities. The filtered sulfur product will often contain even lower levels of less than 0.5% impurities. The molten sulfur product is removed from sulfur filter 57 by line 58. The waste filter cake resulting from the sulfur filtration operation is removed from sulfur filter 57 by line 59. The waste filter cake can be sent to waste or, since it contains 50-70% sulfur, a portion of it can be optionally recycled through the liberation tanks 9 and 11 to recover the sulfur. The waste filter cake may also be removed from the process for recovery of the sulfur via techniques known in the industry.

When applied to volcanic ores containing less than about 10% by weight sulfidic sulfur, the process described herein consistently recovers over 90% of the elemental sulfur contained in the ore.

The use of a mild grinding step, for example, pebble mill grinding, after the heat liberation step is an important feature of the disclosed process. The pebble mill, by producing a flotation feed which meets the relatively rigid particle size requirements of the flotation operation, frees the sensitive heat liberation operation from the task of generating such a suitable feed. Thus, the use of the pebble mill allows the heat liberation operation and the flotation operation to function nearly independently of each other. The lack of dependency permits the efficiency of each of the two operations to be more easily optimized. The lack of dependency between the two operations also gives the overall process greater flexibility.

A significant discovery in accordance with the present invention is that a relatively coarse ore feed may be processed to remove the sulfur more efficiently than a finely ground ore feed. The use of a coarse ore feed improves the operation of both the heat liberation operation and the flotation operation. The coarse ore feed allows easier separation of the liberated sulfur from the ore gangue. The ore gangue retains a large particle size in the heat liberation and flotation operations and is, therefore, easily separated from the fine sulfur particles. The use of coarse ore in conjunction with the use of the selective grinding of the liberated sulfur produce a favorable synergistic effect on the efficiency and flexibility of the process.

Another innovation by the inventors that improves process efficiency and flexibility is the use of an alkaline pH modifier to adjust the pH of ore slurry fed to the heat liberation operation to a value of pH 8 to 9. This innovation followed the discovery that the molten sulfur liberated in the heat liberation units will remain suspended in the slurry at lower agitation rates when the slurry is at pH 8 to 9.

EXAMPLE 1

In this example, the present process was used to test 11 separate ore samples from various volcanic ore deposits. The steps in the process of the invention included initial ore crushing through flotation. Batch-size laboratory equipment was used. The process conditions followed were as follows:

1. Ore feed preparation: The ore was crushed to a particle size of up to ¼ inch diameter.
2. Heat liberation: Feed ore slurry of 66% by weight solids content was adjusted to a pH of 8 to 9 with lime. The slurry was heated with steam at a pressure of about 50 psig in a closed vessel to separate the sulfur from the ore. Slurry temperature was held at 250° F.–280° F. for 2 minutes.

3. Pebble mill grind: The slurry was cooled to solidify the liberated sulfur. The slurry having a solids content of about 50% by weight was ground by a pebble mill to reduce the particle size of the liberated sulfur whereby about 85% of the sulfur particles are about 28 mesh or less. A grinding time of 8–12 minutes was used. The grinding step did not appreciably reduce the particle size of the gangue.

4. Flotation: The feed ore slurry was treated with 0.75 pounds of pine oil per ton of ore solids. The solids content of the slurry undergoing flotation was adjusted to about 10–20% by weight by the addition of water. One rougher and three cleaner steps were used. Each flotation step required about 2 minutes.

Table I presents the results of the 11 tests run.

TABLE I

TEST RESULTS: ELEVEN VOLCANIC ORES SUBJECTED TO PROCESS CONDITIONS

| Sample No. | Original Elemental Sulfur Content (% by Wt.) | Original Sulfidic Sulfur Content (% by Wt.) | Sulfur Recovery[1] (% by Wt.) | Sulfur Grade[2] (% by Wt.) |
|---|---|---|---|---|
| 1 | 53.0 | 3.9 | 97.5 | 96.8 |
| 2 | 29.5 | 3.8 | 93.8 | 98.3 |
| 3 | 47.1 | 3.1 | 92.5 | 94.0 |
| 4 | 37.1 | 2.9 | 95.2 | 96.9 |
| 5 | 36.4 | 4.0 | 94.5 | 98.6 |
| 6 | 23.6 | 2.0 | 94.5 | 98.9 |
| 7 | 39.5 | 3.4 | 91.0 | 97.4 |
| 8 | 37.6 | 5.3 | 93.4 | 98.8 |
| 9 | 52.9 | 1.6 | 91.5 | 97.4 |
| 10 | 46.9 | 2.9 | 93.0 | 98.3 |
| 11 | 40.5 | 0.9 | 92.1 | 98.6 |

Table Notes:
[1] Sulfur recovery is the percent of elemental sulfur contained in the original ore that is recovered by the present process.
[2] Sulfur grade is the percent sulfur contained in the flotation concentrate.

Products with excellent sulfur grade and sulfur recovery characteristics were produced with the samples processed. The test results shown in Table 1 show clearly that the amount of element sulfur contained in the ore appears to have little or no effect on sulfur grade or sulfur recovery.

EXAMPLE 2

This example illustrates the ability of the pebble mill to preferentially grind sulfur thereby producing the small size sulfur particles which are amenable to the flotation operation.

The volcanic sulfur-containing ore used in this example was taken from the Aucanquilcha volcanic ore body in Chile. The procedure used was the same as in Example 1. Table 2 presents the results of particle size distribution tests performed on samples taken of the solid components of the slurry product exiting the heat liberation operation.

TABLE 2

PARTICLE SIZE DISTRIBUTION OF SULFUR AND ORE GANGUE PRODUCT EXITING THE HEAT LIBERATION OPERATION-AUCANQUILCHA ORE

| Particle Size (Tyler Mesh) | Particle Size Distribution | |
|---|---|---|
| | Sulfur (wt. %) | Ore Gangue (wt. %) |
| +35 | 58.6 | 55.8 |
| 35 × 100 | 27.0 | 11.2 |
| −100 | 14.3 | 33.0 |

The sulfur particle size distribution shown in Table 2 was not satisfactory for optimum flotation. Smaller sulfur particle size was needed and the pebble mill grinding step was used to reduce the particle size. Table 3 presents the results of particle size distribution tests performed on samples taken of the solid components of the slurry product exiting the pebble mill grinding operation.

TABLE 3

PARTICLE SIZE DISTRIBUTION OF SULFUR AND ORE GANGUE PRODUCT EXITING THE PEBBLE MILL GRINDING OPERATION-AUCANQUILCHA ORE

| Particle Size (Tyler Mesh) | Particle Size Distribution | |
|---|---|---|
| | Sulfur (wt. %) | Ore Gangue (wt. %) |
| +35 | 2.7 | 22.7 |
| 35 × 100 | 12.3 | 21.3 |
| −100 | 85.0 | 46.0 |

Table 3 shows that the amount of −100 mesh sulfur particles has increased substantially as a result of the pebble grinding operation while the amount of −100 mesh ore gangue particles has increased only slightly. The preferential grinding feature of pebble grinders was demonstrated by the example.

We claim:

1. A process for removing elemental sulfur from ores containing elemental sulfur comprising:
   (a) crushing a sulfur-containing ore to a coarse particle size wherein ore particles produced during crushing enable substantially all of the sulfur to be liberated during a heating step and to produce an ore gangue that is substantially not susceptible to flotation;
   (b) forming an aqueous ore slurry containing about 50–80% by weight or solids from the crushed ore and adjusting the pH to at least a pH of about 8.0;
   (c) heating the aqueous ore slurry formed in step (b) under elevated pressure to a temperature of about 240°–315° F. for sufficient time to melt and liberate elemental sulfur contained in said ore to produce liberated molten sulfur and ore gangue, wherein the slurry is heated while agitating the slurry at sufficient velocity to substantially maintain the ore, ore gangue and liberated molten sulfur in suspension;
   (d) cooling the heated slurry sufficiently to resolidify said liberated molten sulfur;
   (e) conditioning the aqueous slurry of step (d) with a flotation aid;
   (f) separating the condition aqueous slurry of ore gangue and resolidified sulfur in a flotation unit to produce a sulfur-rich flotation concentrate oversteam; and
   (g) recovering the sulfur-rich flotation concentrate and separating the sulfur therefrom.

2. The process of claim 1 wherein the ore is a volcanic ore or a non-volcanic ore.

3. The process of claim 1 wherein the ore slurry is agitated during the heating step for a period of time and at a velocity sufficient to produce liberated sulfur particles having about 85% by weight of the particles about 28 mesh or smaller.

4. The process of claim 1 wherein the ore particles are substantially crushed to a size of about 1/5" to about ⅜" diameter.

5. The process of claim 1 wherein the ore particles are substantially crushed to a size of about 1/10" to about 1" diameter.

6. The process of claim 1 wherein the ore is crushed to a particle size such that less than about 15% by weight of the ore is −100 mesh.

7. The process of claim 1 wherein the solids content of the ore slurry formed in step (b) is 60-70% by weight.

8. The process of claim 1 wherein the solids content of the ore slurry formed in step (b) is 64-68% by weight.

9. The process of claim 1 wherein the slurry is heated to a temperature of about 250°-280° F.

10. The process of claim 1 wherein the heating is carried out in multiple pressurized vessels arranged in series.

11. The process of claim 1 wherein the heating is carried out in multiple pressurized vessels arranged in parallel.

12. The process of claim 1 wherein the ore slurry is continuously passed through a heating means to heat said slurry.

13. The process of claim 1 wherein the heating operation is carried out on a batch basis.

14. The process of claim 1 further comprising the step of reducing the particle size of the resolidified sulfur before flotation of the sulfur without substantially reducing the particle size of the ore gangue.

15. The process of claim 14 wherein the slurry of ore gangue and resolidified liberated sulfur is processed by size reduction means to selectively reduce the size of sulfur particles to where at least 85% by weight of sulfur particles pass 28 mesh or smaller, wherein said processing does not significantly affect the size of the ore gangue particles.

16. The process of claim 14 wherein the particle size of the resolidified sulfur is reduced in a pebble mill.

17. The process of claim 1 wherein the flotation aid is pine oil and is added to the slurry of step (g) in an amount of about 0.75 pounds of pine oil per ton of ore solids.

18. The process of claim 1 wherein water is added to the aqueous slurry of ore gangue and solid sulfur undergoing flotation to adjust the solids content of said slurry to about 10-20% by weight.

19. The process of claim 1 wherein a sulfur product is recovered from said sulfur-rich flotation concentrate by the steps of:
    (a) heating said sulfur-rich flotation concentrate sufficiently to remelt said sulfur and separating said remelted sulfur from water and other impurities; and
    (b) filtering said remelted sulfur.

20. A process for recovering elemental sulfur from ore containing elemental sulfur comprising:
    (a) crushing said ore to a coarse particle size of less than about 1" diameter;
    (b) forming an aqueous slurry of about 60-70% solids from the crushed ore;
    (c) adjusting the pH of said aqueous slurry to a value of at least 8.0 by the addition of an effective amount of an alkaline material;
    (d) autoclaving said aqueous ore slurry in a pressurized vessel at a temperature of about 250°-280° F. for sufficient time to melt and liberate elemental sulfur contained in said ore as molten sulfur while continuously agitating the slurry at sufficient velocity to maintain the ore, one gangue produced by the autoclaving, and liberated molten sulfur in suspension;
    (e) cooling the heated slurry sufficiently to resolidify said liberated, molten sulfur;
    (f) milling the resulting slurry to selectively reduce the size of the solidified sulfur particles to where more than about 85% by weight of sulfur particles pass 28 mesh, wherein said milling does not significantly reduce the size of the ore gangue particles;
    (g) adding a flotation aid to the slurry;
    (h) subjecting the aqueous slurry of ore gangue and solidified sulfur to flotation to produce sulfur-rich flotation concentrate overstream, wherein
    (i) recovering a sulfur product of at least 99% purity from said sulfur-rich flotation concentrate.

21. The process of claim 20 wherein the ore is a volcanic ore or a non-volcanic ore.

22. The process of claim 20 wherein the ore particles are substantially reduced to a size of about 1/5" to about ⅜" diameter.

23. The process of claim 20 wherein the ore is reduced to a particle size such that less than about 15% by weight of the crushed ore is −100 mesh.

24. The process of claim 20 wherein the solids content of the ore slurry formed in step (b) is about 64-68%.

25. The process of claim 20 wherein the autoclaving is carried out in multiple pressurized vessels arranged in series.

26. The process of claim 20 wherein the autoclaving is carried out in multiple pressurized vessels arranged in parallel.

27. The process of claim 20 wherein the autoclaving is carried out on a continuous basis.

28. The process of claim 20 wherein the autoclaving is carried out on a batch basis.

29. The process of claim 20 wherein at least 90% of the elemental sulfur originally contained in the ore is recovered.

30. The process of claim 20 wherein a sulfur product is recovered from said sulfur-rich flotation concentrate by the steps of:
    (a) heating sulfur-rich flotation concentrate sufficiently to remelt said sulfur and separating said remelted sulfur from water and other impurities; and
    (b) filtering said remelted sulfur to recover a sulfur product of at least 99% purity.

31. The process of claim 20 wherein the ore slurry is agitated during autoclaving for a period of time and at a velocity sufficient to produce liberated sulfur particles having about 85% by weight of the particles about 28 mesh or smaller.

* * * * *